May 28, 1963 P. R. NELSON 3,091,266
SAW BLADE
Filed June 13, 1960

INVENTOR.
PAUL R. NELSON
BY
ATTORNEY

United States Patent Office 3,091,266
Patented May 28, 1963

3,091,266
SAW BLADE
Paul R. Nelson, 1306 Meyerson Ave. SE., Canton, Ohio
Filed June 13, 1960, Ser. No. 35,690
1 Claim. (Cl. 143—133)

This invention relates to saw blade construction and in particular has reference to a new and improved type of saw blade having specially formed and set saw teeth that improve the ease with which wood may be cut.

In the art of saw construction, it has long been known that a plurality of teeth can be formed along the edge of a blade-like member so as to effectuate a sawing action upon reciprocation of the blade through the work piece being sawed. In the normal instance, the teeth of the saw blade are "set" at a slight degree of projection so as to make the width of the cut somewhat greater than the width of the saw blade so as to provide clearance during cutting.

While saw blade construction of the type above described has been known for some time, it has been found that improved results can be obtained by providing specially contoured saw teeth that are alternately set at opposed angles and which are further beveled to facilitate ease of withdrawal so as to permit an extremely smooth cutting action.

In addition to the aforementioned advantages, it has been found that a greater efficiency in sawing will be obtained if the cutting teeth per se are limited in the amount of cut that the same can make during each stroke of the saw blade. Specifically, in conventional saws, no provision is made with the result that the depth of cut in each stroke depends upon the user. It has been found, however, that if a series of guaged teeth are interposed between the cutting teeth, that the same will effectively limit the depth of cut to a certain predetermined amount, with the result that a uniform cut will occur during each stroke so that a constant force is required during each stroke of the saw blade.

As a further disadvantage of the conventional saws taught by the prior art, it is believed well known that the same are, at best, difficult to sharpen and require the use of special tools operated by skilled mechanics to properly effectuate sharpening of the same. The difficulty in this regard occurs because of the fact that the beveled edges must be sharpened at exactly the correct angle and, accordingly, a machine to locate the sharpening tool is normally required.

It accordingly becomes the principal object of this invention to provide an improved type of saw blade that is characterized by the presence of cutting teeth that are alternately arranged with oppositely beveled cutting edges and with depth control means being provided between such teeth for the purpose of limiting the depth of cut during each cutting stroke.

It is a still further object of this invention to provide an improved type of saw blade that is characterized by the fact that the cutting teeth per se are contoured for smooth cutting action.

It is a still further object of this nvention to provide an improved type of saw having teeth that are designed to be easily and readily sharpened by the use of ordinary conventional hand tools.

Other objects of the invention will become more apparent upon a reading of the following brief specification, considered and interpreted in the light of the accompanying drawings.

Of the drawings:
FIGURE 1 is a side elevation of the improved saw embodying the features of the invention.

Figure 2:
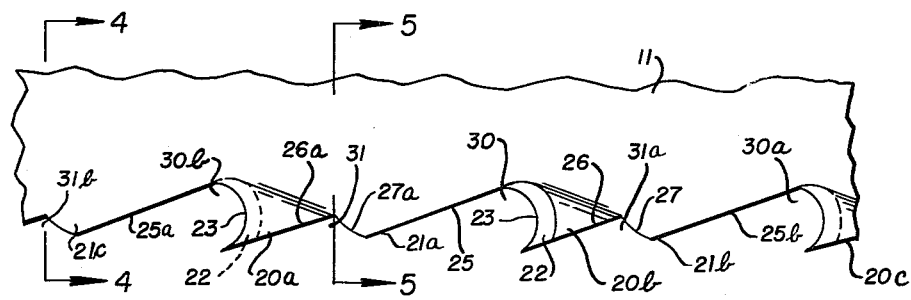
FIGURE 2 is an enlarged fragmentary view in side elevation of an intermediate portion of the blade.
Figures 4, 5:
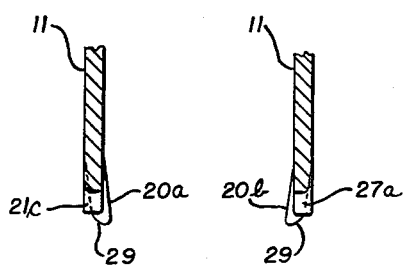

FIGURES 4 and 5 are transverse sections taken on the lines 4—4 and 5—5 of FIGURE 2.

Figure 1:
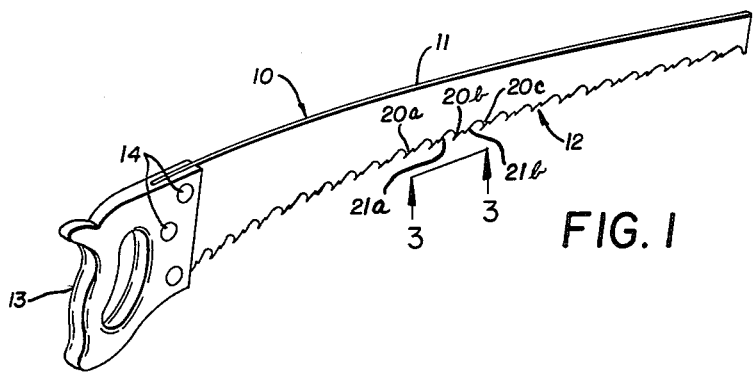

Referring now to the drawings and in particular to FIGURE 1 thereof, the improved saw, generally designated by the numeral 10, is shown including a blade portion 11 having a cutting edge 12, with blade 11 being secured at one longitudinal end to a handle portion 13 by the use of conventional bolts or other fastening means 14, 14. It will be seen from FIGURE 1 that the preferred embodiment of the invention illustrates a blade 11 of generally elongate arcuate planar configuration, but it is to be understood that the contour of the blade could be changed to an ordinary straight type of saw blade if desired.

Referring now to FIGURES 2 through 5 of the drawings, it will be seen that the cutting edge 12 includes a series of cutting teeth 20a, 20b and 20c between which are disposed unset guage teeth 21a, 21b; the arrangement being such that the teeth 20a, 20b and 20c are oppositely set with respect to each other (see FIGURE 3) while the unset teeth 21a, 21b are offset with respect to a plane that passes through the projecting edges of the teeth 20a, 20b and 20c so as to serve as depth control guages as will presently be described.

Figure 3:
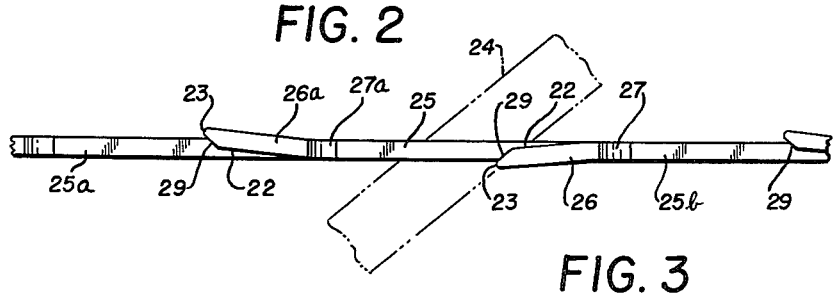
FIGURE 3 is a bottom plan view taken on the lines 3—3 of FIGURE 1.

Referring next to FIGURE 2, it will be seen that each tooth 20a, 20b and 20c includes a cutting surface 22 that terminates in a cutting edge 23, with the cutting face 22 and cutting edge 23 of each tooth being preferably crescent shaped in contour for the purpose of facilitating sharpening by a tool 24, as is clearly shown in FIGURE 3 of the drawings.

In addition, the teeth 20a, 20b and 20c are shown alternately oppositely set with respect to each other so as to have their successive cutting edges 23 projecting beyond the opposed surfaces of the blade 11 for cutting purposes, as is shown in FIGURE 3 of the drawings. It is to also be understood that the cutting faces 22, 22 and the cutting edges 23, 23 of teeth 20a, 20b and 20c are similarly oppositely beveled, with this condition being best shown in FIGURE 2 of the drawings.

For the purpose of providing notches and gullets on the cutting edge 12, the rear face 25 of tooth 21a, for example, is shown tapering to a point of juncture with the cutting face 22 of tooth 20b, while the front or leading portion 27a of tooth 21a connects with the rear face 26a of tooth 20a. In this fashion, a gullet 30 and a notch 31 are provided on opposed sides of the guage tooth 21a, it being understood that similar gullets 30a and 30b are defined adjacent the teeth 20c and 20a, respectively, while similar notches 31a and 31b, are disposed forwardly of the guage teeth 21b and 21c, as clearly shown in FIGURE 2 of the drawings. All of these gullets and notches will be identical in contour except that the gullet 30 will be oppositely set with respect to the gullets 30a and 30b.

Preferably, and as best shown in FIGURES 3, 4 and 5 of the drawings, each cutting tooth 20a, 20b and 20c further includes a rounded edge portion 29 that insures smooth cutting action during the non-cutting movement of the saw blade.

In use or operation of the improved saw, it is believed apparent that during the cutting stroke that would occur in movement of the saw blade to the left of FIGURE 1, for example, the cutting teeth 20a, 20b and 20c will create a cut of width greater than the thickness of the blade 11 and the depth of the cut on each successive stroke will be limited by the engagement of the guage teeth 21, 21, with the kerf that has been previously created by the saw teeth during the preceding stroke. Thus, during each cutting stroke, the teeth will be limited in their penetration depth and the saw blade will have equal cutting force applied on the opposed faces thereof due to the oppositely set arrangement of both the teeth and the cutting faces thereof. Still further, during the withdrawal, the rounded or beveled edges 29, 29 of each tooth will facilitate easy withdrawal so that a uniform cut can be obtained with a minimal amount of effort.

When it is desired to sharpen the blade, a file 24 or the like may be easily inserted against each cutting face 22 and upon reciprocation thereof along the angle indicated in chain-dotted lines in FIGURE 3, it is believed apparent that a sharp edge will once again be attained on the cutting edge 23, with the crescent shaped contour of each tooth 20, 20 serving to guide the sharpening tool 24 during such sharpening.

While a full and complete disclosure of the invention has been set forth in accordance with the dictates of the patent statutes, it is to be understood that the invention is not intended to be so limited.

Accordingly, modifications of the invention may be resorted to without departing from the spirit hereof or the scope of the appended claim.

What is claimed is:

A saw of the character described, comprising; an elongate metallic blade including a cutting edge along one longitudinal side thereof; said cutting edge having a series of oppositely set cutting teeth disposed thereon at longitudinally spaced points and a series of gullets disposed between adjacent cutting teeth; said cutting teeth including oppositely beveled concave cutting edges substantially arcuate in configuration alternately oppositely offset from the longitudinal axis of said blade; said cutting edges of said cutting teeth having their projecting tips rounded and further having a depth substantially equal to the depth of said gullets; recesses between each said gullet and cutting tooth forming depth teeth for controlling the cutting depth of said cutting teeth; said depth teeth having a convex leading edge and further being offset to the projecting edges of said cutting teeth; and a handle secured to one longitudinal end of said elongate blade.

References Cited in the file of this patent

UNITED STATES PATENTS

| 124,825 | Jincks | Mar. 19, 1872 |
| 576,724 | Foster | Feb. 9, 1897 |
| 615,005 | Walquist | Nov. 29, 1898 |
| 858,652 | Harrison | July 2, 1907 |
| 1,666,987 | Billingsley | Apr. 24, 1928 |
| 1,919,748 | Roberts | July 25, 1933 |
| 2,763,298 | Tomkies | Sept. 18, 1956 |

FOREIGN PATENTS

| 298,594 | Switzerland | July 16, 1954 |